(12) United States Patent
Yaccarino et al.

(10) Patent No.: US 10,377,229 B2
(45) Date of Patent: Aug. 13, 2019

(54) FUEL STORAGE ASSEMBLY FOR A VEHICLE

(71) Applicant: GM Global Technology Operations LLC, Detroit, MI (US)

(72) Inventors: Philip A. Yaccarino, Troy, MI (US); George J. Marlow, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/592,525

(22) Filed: May 11, 2017

(65) Prior Publication Data

US 2018/0328324 A1    Nov. 15, 2018

(51) Int. Cl.
| | |
|---|---|
| *B60K 15/035* | (2006.01) |
| *G01L 19/00* | (2006.01) |
| *F02M 37/10* | (2006.01) |
| *B60K 15/073* | (2006.01) |
| *F02M 37/14* | (2006.01) |
| *F02M 37/00* | (2006.01) |
| *B60K 15/03* | (2006.01) |

(52) U.S. Cl.
CPC .......... *B60K 15/035* (2013.01); *B60K 15/073* (2013.01); *F02M 37/0094* (2013.01); *F02M 37/10* (2013.01); *F02M 37/14* (2013.01); *G01L 19/0007* (2013.01); *B60K 2015/0321* (2013.01); *B60K 2015/03243* (2013.01); *B60K 2015/03514* (2013.01); *B60K 2015/03523* (2013.01); *B60K 2015/03528* (2013.01); *Y10T 137/8326* (2015.04); *Y10T 137/86348* (2015.04)

(58) Field of Classification Search
CPC ......... Y10T 137/8326; Y10T 137/3084; Y10T 137/86348; B60K 2015/03528; B60K 15/03519; B60K 2015/03514; B60K 2015/03523; G01L 19/0007
See application file for complete search history.

(56) References Cited

U.S. PATENT DOCUMENTS

| | | | | |
|---|---|---|---|---|
| 5,308,689 | A * | 5/1994 | Shinkai | A41D 31/02 442/76 |
| 5,421,845 | A * | 6/1995 | Gregg | B01D 46/0068 55/294 |
| 5,687,756 | A * | 11/1997 | VanNatta | B60K 15/03519 137/202 |
| 5,918,282 | A * | 6/1999 | Schwager | B60K 15/035 73/756 |
| 6,895,943 | B1 * | 5/2005 | Taxon | B60K 15/03519 123/516 |
| 6,994,103 | B2 * | 2/2006 | Takahashi | F16K 24/044 137/202 |

(Continued)

*Primary Examiner* — Atif H Chaudry
(74) *Attorney, Agent, or Firm* — Cantor Colburn LLP

(57) ABSTRACT

A fuel storage assembly for a vehicle includes a fuel tank defining a fuel chamber, a fuel pump module and a vapor pressure detection system. The fuel pump module includes a flange engaged to the fuel tank and a fuel pump assembly supported by the flange and disposed in the fuel chamber. The vapor pressure detection system includes a vapor pressure sensor attached to the flange, a vapor pressure inlet device disposed in the fuel chamber, and a conduit communicating between the vapor pressure inlet device and the vapor pressure sensor.

4 Claims, 3 Drawing Sheets

(56) References Cited

U.S. PATENT DOCUMENTS

| | | | | |
|---|---|---|---|---|
| 2003/0094458 A1* | 5/2003 | Beyer | ............... | B60K 15/03519 |
| | | | | 220/562 |
| 2004/0256006 A1* | 12/2004 | Aschoff | ............... | B60K 15/035 |
| | | | | 137/202 |
| 2005/0127078 A1* | 6/2005 | Vorenkamp | ............... | B29C 66/61 |
| | | | | 220/562 |
| 2014/0209051 A1* | 7/2014 | Jackson | ............... | F02M 35/0218 |
| | | | | 123/184.53 |

* cited by examiner

FUEL STORAGE ASSEMBLY FOR A VEHICLE

INTRODUCTION

The subject disclosure relates to a fuel storage assembly of a vehicle, and more particularly, to a vapor pressure detection system of the fuel storage assembly.

Fuel tank systems, such as those used for vehicles, may include the capability to measure fuel vapor pressure within a fuel tank of the system. Typical fuel vapor pressure sensors used to measure the fuel vapor pressure within the tank are limited as to where they can be mounted onto the fuel tank while communicating through the tank. Such limits may further restrict packaging options of the fuel tank relative to the vehicle itself.

Accordingly, further design enhancements relative to fuel vapor pressure sensors and supporting components of the fuel tank system are desirable.

SUMMARY

A fuel storage assembly for a vehicle according to one, non-limiting, embodiment of the present disclosure includes a fuel tank, a fuel pump module, and a vapor detection system. The fuel tank defines a fuel chamber. The fuel pump module includes a flange engaged to the fuel tank and a fuel pump assembly supported by the flange and disposed in the fuel chamber. The includes a vapor pressure sensor attached to the flange, a vapor pressure inlet device disposed in the fuel chamber, and a conduit attached to the vapor pressure inlet device, which communicates between the vapor pressure inlet device and the vapor pressure sensor.

Additionally to the foregoing embodiment, the vapor pressure inlet device is disposed at an elevation higher than the flange.

In the alternative or additionally thereto, in the foregoing embodiment, the fuel tank includes a maximum fuel level, and the vapor pressure inlet device is disposed above the maximum fuel level.

In the alternative or additionally thereto, in the foregoing embodiment, the flange is disposed below the maximum fuel level.

In the alternative or additionally thereto, in the foregoing embodiment, the vapor pressure inlet device includes a vapor permeable membrane constructed and arranged to prevent migration of liquid fuel into an inlet end segment of the conduit.

In the alternative or additionally thereto, in the foregoing embodiment, the vapor pressure inlet device includes a birdcage structure attached to the conduit and covered by the vapor permeable membrane.

In the alternative or additionally thereto, in the foregoing embodiment, the vapor permeable membrane is a synthetic fabric.

In the alternative or additionally thereto, in the foregoing embodiment, the conduit is a tube constructed and arranged to provide vapor pressure communication between the vapor pressure inlet device and the vapor pressure sensor.

A fuel storage assembly for a vehicle according to another, non-limiting, embodiment includes a fuel tank defining a fuel chamber having a vapor dome and a vapor pressure detection system including a vapor pressure sensor disposed outside of the fuel tank, a vapor permeable membrane, and a conduit extending between the vapor dome and the vapor pressure sensor for providing communication there-between, wherein the conduit includes an inlet end segment disposed in the vapor dome and confronted by the vapor permeable membrane to restrict migration of liquid fuel into the inlet end segment.

Additionally to the foregoing embodiment, the fuel storage assembly includes a flange attached to the fuel tank, wherein the inlet end segment communicates with the vapor pressure sensor through the flange.

In the alternative or additionally thereto, in the foregoing embodiment, the vapor pressure sensor is attached to the flange.

In the alternative or additionally thereto, in the foregoing embodiment, the flange is part of a fuel pump module.

In the alternative or additionally thereto, in the foregoing embodiment, the vapor dome is defined by a portion of the fuel tank and a surface of the liquid fuel.

In the alternative or additionally thereto, in the foregoing embodiment, the fuel tank is a saddle fuel tank.

A vapor pressure detection system for a vehicle fuel tank according to another, non-limiting, embodiment includes a fuel vapor permeable membrane, a vapor pressure sensor, and a tube that extends between the fuel vapor permeable membrane and the vapor pressure sensor. The tube, at least in-part, provides communication between an inlet end segment of the tube and the vapor pressure sensor. The fuel vapor permeable membrane generally covers at least a portion of the inlet end segment of the tube.

Additionally to the foregoing embodiment, the vapor pressure detection system includes a flange constructed and arranged to be attached to the fuel tank, wherein communication between the inlet end segment of the tube and the vapor pressure sensor is through the flange.

In the alternative or additionally thereto, in the foregoing embodiment, the vapor pressure sensor is attached to the flange.

In the alternative or additionally thereto, in the foregoing embodiment, the vapor pressure sensor includes an encasement having an electrical connection portion and a nipple portion extending through the flange for connection to an outlet end segment of the tube opposite the inlet end segment.

In the alternative or additionally thereto, in the foregoing embodiment, the vapor pressure detection system includes a birdcage structure attached to the inlet end segment, wherein the vapor permeable membrane covers the birdcage structure.

In the alternative or additionally thereto, in the foregoing embodiment, the vapor permeable membrane is generally impermeable to liquid.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
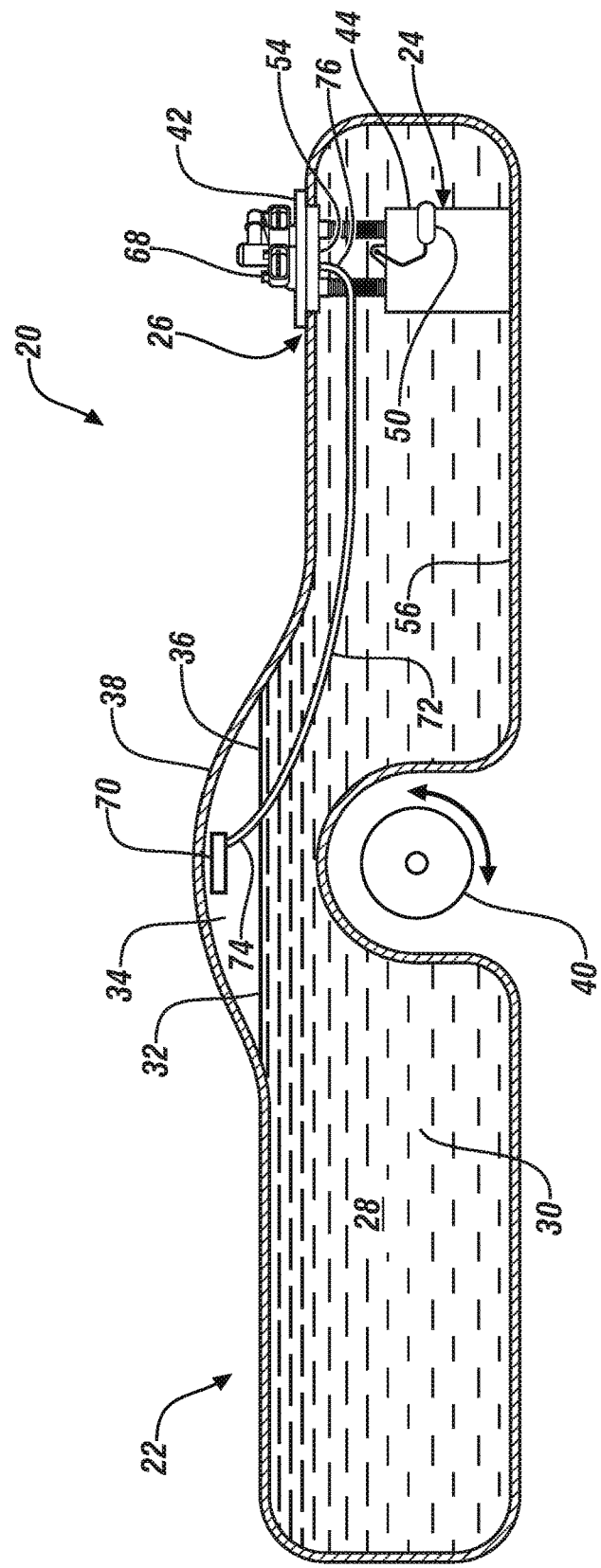
FIG. 1 is a cross section of a fuel storage assembly.

The following description is merely exemplary in nature and is not intended to limit the present disclosure, its application or uses. It should be understood that throughout the drawings, corresponding reference numerals indicate like or corresponding parts and features.

In accordance with an exemplary embodiment, FIG. 1 illustrates a fuel storage assembly 20 that may be for a vehicle. The fuel storage assembly 20 may include a fuel tank 22, a fuel pump module 24, and a vapor pressure detection system 26. The fuel tank 22 includes boundaries that define a chamber 28 for the storage of fuel 30. The fuel tank 22 may generally include a maximum fuel level 32 that is associated with the maximum volume of liquid fuel that the tank 22 is designed to store. Because the volume of the chamber 28 may be larger than the maximum volume of liquid fuel stored in the fuel tank 22, the chamber 28 may include a vapor dome 34. The vapor dome 34 may generally be defined by a surface 36 of the liquid fuel and an overhead portion 38 of the fuel tank 22. The volume of the vapor dome 34 is at a minimum when the surface 36 is generally aligned with a maximum fuel level 32. In one embodiment, the fuel tank 22 may be a saddle fuel tank that is shaped, for example, about a rotating drive shaft 40 of the vehicle.

Figure 2:
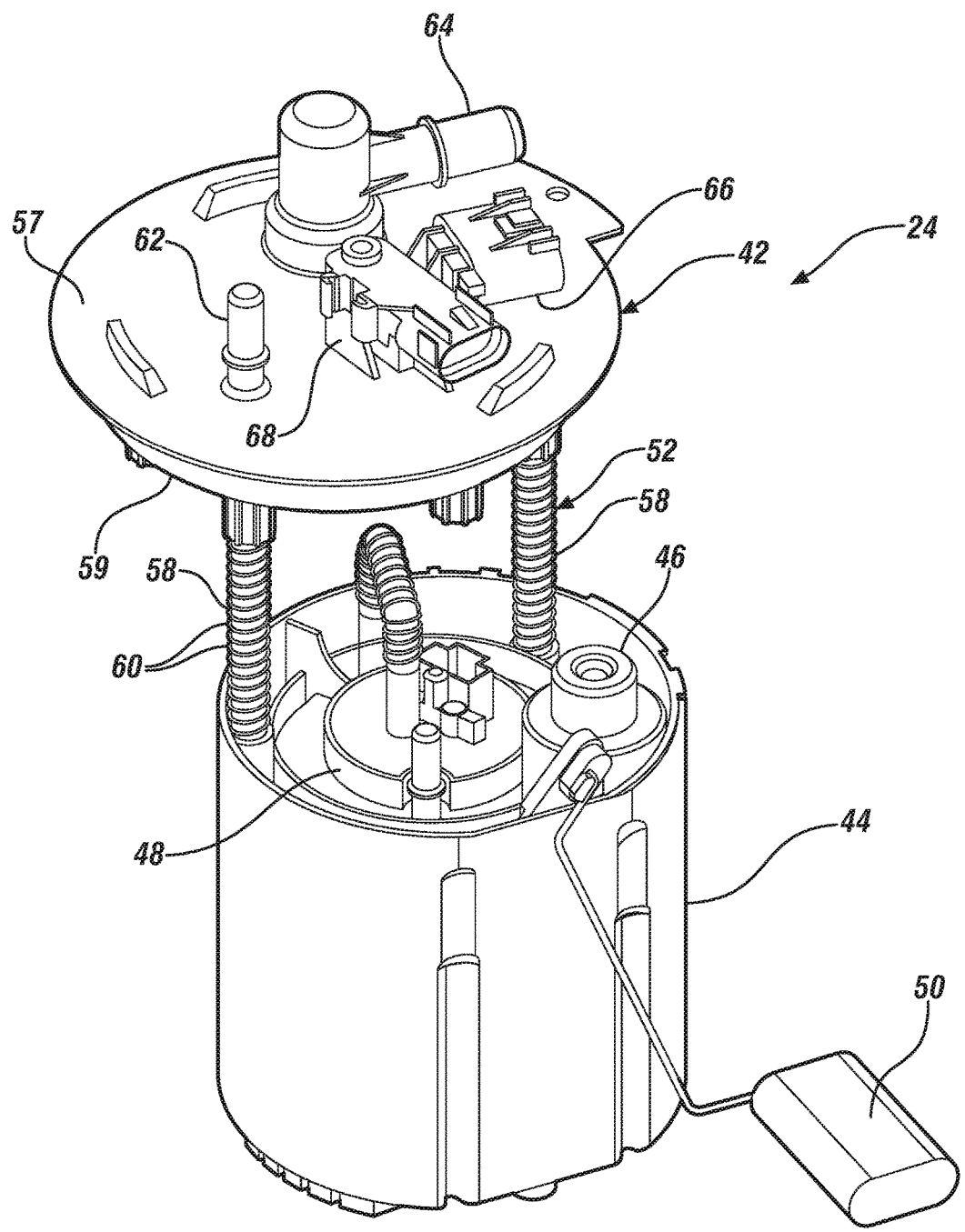
FIG. 2 is a perspective view of a fuel pump module of the fuel storage assembly.

Referring to FIGS. 1 and 2, the fuel pump module 24 may include a flange 42, a casing 44, a fuel pressure regulator 46, a fuel pump 48, a fuel level indicator or float 50, and a support structure 52. The flange 42 is constructed and arranged to attach to the fuel tank 22 and sealably cover an opening 54 in the tank 22. The opening 54 may be large enough to permit insertion of the casing 44 through the tank wall and into the chamber 28. In some embodiments and depending upon vehicle packaging of the fuel tank 22, the flange 42 may be located beneath the maximum fuel level 32 of the fuel tank 22, and thus beneath the vapor dome 34.

The casing 44 may be located, and may contact, a bottom 56 of the fuel tank 22. The casing 44 may encase, and may structurally support, the fuel pressure regulator 46 and the fuel pump 48. In some applications, the casing 44 may include boundaries that define a fuel reservoir (not shown) substantially located beneath the fuel pump 48. In one example, the support structure 52 may be, or may include, support rods 58 (i.e., two illustrated in FIG. 2) that extend substantially vertically between, and are engaged to, the flange 42 and the casing 44. The support structure 52 may further include coiled springs 60 adapted to bias the casing 44 downward and against the bottom 56 of the fuel tank 22. It is understood and contemplated that the fuel pump module 24 may be any type of known fuel pump module having a flange that sealably attaches to the fuel tank 22. For example, the casing 44 may be rigidly attached to the flange 42 and may not require the support structure 52.

Referring to FIG. 2, the flange 42 may include surfaces 57, 59 that face in opposite directions. The surface 57 may be an outer surface that may face substantially upward or outward. The surface 59 may be an inner surface that defines, in-part, the fuel chamber 28 and may face substantially downward or inward. In one embodiment, the flange 42 may include a multitude of openings that generally provide communication into the fuel chamber 28. For example, the flange 42 may include a fuel outlet nozzle 62 and a vapor nozzle 64 each projecting upward from the outer surface 57 and defining a respective opening through the flange 42. Yet further, an electrical connector 66 may be mounted to the outer surface 57 of the flange 42 and is adapted to route various electrical wires sealably through the flange 42 and to the fuel pump 48 and a level sender associated with the level float 50.

Referring to FIG. 1, the vapor pressure detection system 26 may include a vapor detection sensor 68, a vapor pressure inlet device 70, and an elongated tube or conduit 72 that extends and provides communication between the vapor detection sensor 68 and the vapor pressure inlet device 70. More specifically, the conduit 72 may include, and spans between, an inlet end segment 74 engaged to the vapor pressure inlet device 70, and an outlet end segment 76 engaged to the vapor detection sensor 68.

The vapor detection sensor 68 may be attached to the outer surface 57 of the flange 42. The vapor pressure inlet device 70 may be located in the vapor dome 34 of the fuel chamber 28, and is thus prevented from being submerged in the liquid fuel 30 for any appreciable length in time. It is further contemplated and understood that the vapor detection sensor 68 may be mounted to any vehicle structure outside of the fuel tank 22, or any other location where a fuel impregnated environment will not degrade sensor operation. For example and with a proper housing (not shown) capable of protecting the sensor 68 from adverse effects of fuel, the sensor may be located inside the fuel tank 22. In one embodiment, the flange 42 may not be associated with the fuel pump module 24, and instead may be part of the vapor pressure detection system 26.

In one embodiment, the vapor pressure inlet device 70 may be attached to the inside wall or surface of the overhead portion 38 of the fuel tank 22. Similarly, the conduit 72 may be attached to the inner walls of the fuel tank 22 for structural integrity. In other embodiments, the vapor pressure inlet device 70 and the conduit 72 may be attached directly to other structures (not shown) in the fuel chamber 28 to facilitate structural integrity. Such structures may include other internal tubing that may facilitate other fuel system functions.

Figure 3:
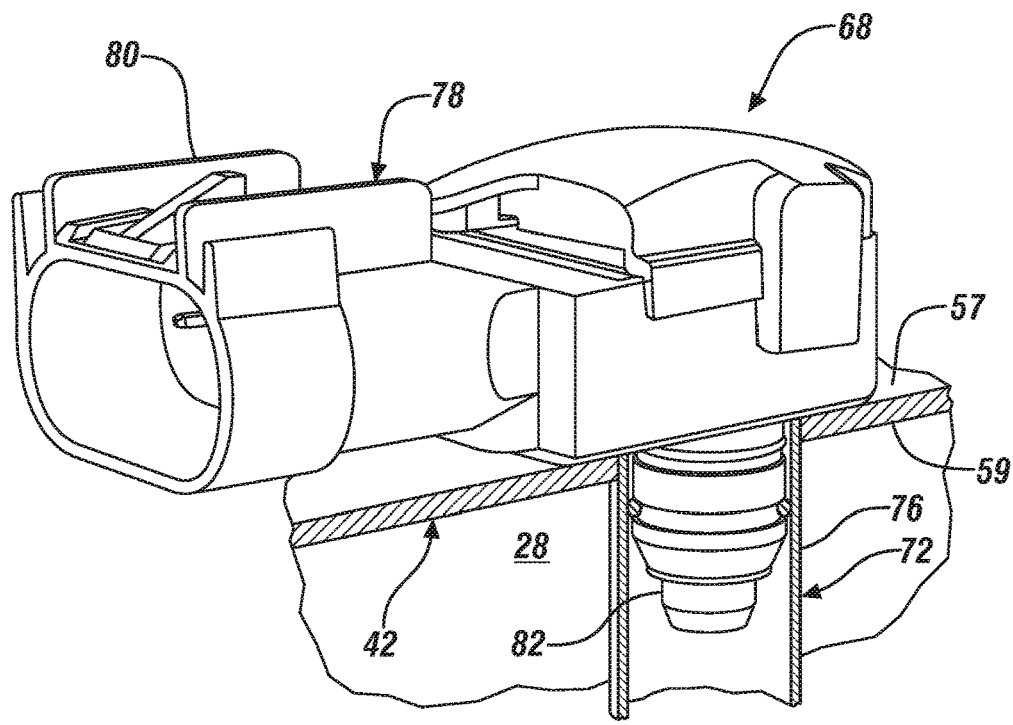
FIG. 3 is a perspective view of a vapor pressure sensor of the fuel storage assembly mounted to a flange of the fuel pump module.

Referring to FIGS. 2 and 3, the vapor detection sensor 68 may include an encasement 78 having electrical connector portion 80 and a nipple or nozzle portion 82. The encasement 78 may be attached to the outer surface 57 of the flange 42. The electrical connector portion 80 facilitates the connection of electrical wires that may be routed to, for example, a vehicle controller that requires vapor pressure readings within the fuel tank 22. The nozzle portion 82 may sealably project through the flange 42 and into the fuel chamber 28 for connection to the outlet end segment 76 of the conduit 72. This connection may be a press fit connection or any other type of connection typically known in the art of connecting conduits or tubes. It is further contemplated and understood that the encasement 78, or a portion of the encasement, may be an integral and unitary part of the flange 42.

Figure 4:
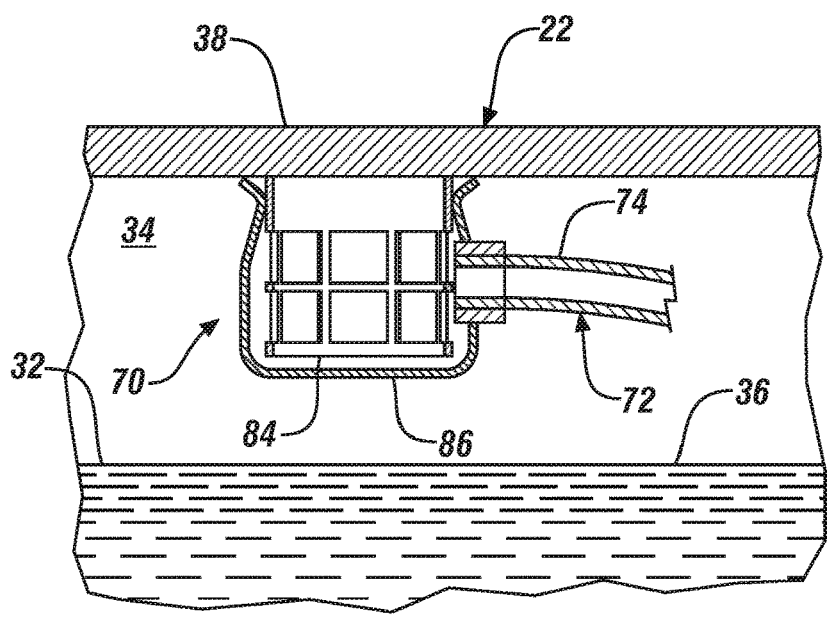
FIG. 4 is a cross section of a vapor pressure inlet device of the fuel storage assembly mounted inside a fuel tank of the fuel storage assembly.

Referring to FIG. 4, the vapor pressure inlet device 70 may generally include an inlet structure 84 and a vapor permeable membrane 86. The inlet structure 84 may, for example, be a birdcage structure that promotes communication of vapor pressure through the conduit 72. In one embodiment, the birdcage structure 84 may be engaged to the overhead portion 38 of the fuel tank 22. The inlet end segment 74 of the conduit 72 may be attached to the birdcage structure 84. The vapor permeable membrane 86 may generally wrap about, or covers, the birdcage structure 84 to promote the permeation of fuel vapor into the structure 84 so that vapor pressure may be properly sensed through the conduit 72.

The vapor permeable membrane 86 may be substantially impermeable to the liquid fuel 30. This resistance of liquid fuel migration through the membrane 86 generally minimizes or eliminates any ingress of liquid fuel into the conduit 72 that may degrade pressure sensing capability. One, non-limiting, example of a vapor permeable membrane 86 may be a synthetic fabric that may be generally flexible (e.g., expanded polytetrafluoroethylene). An example of such a fabric is Gore-Tex® fabric that is generally waterproof yet 'breathable.'

Advantages and benefits of the present disclosure include greater design flexibility of fuel tanks and improved packaging within a vehicle while maintaining a reliable and robust fuel vapor pressure sensing capability.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A vapor pressure detection system for a vehicle fuel tank comprising:
    a fuel vapor permeable membrane;
    a vapor pressure sensor;
    a tube extending between the fuel vapor permeable membrane and the vapor pressure sensor providing at least in-part communication between an inlet end segment of the tube and the vapor pressure sensor, wherein the fuel vapor permeable membrane generally covers at least a portion of the inlet end segment of the tube; and
    a flange constructed and arranged to be attached to the vehicle fuel tank, wherein communication between the inlet end segment of the tube and the vapor pressure sensor is through the flange, wherein the vapor pressure sensor includes an encasement having an electrical connection portion and a nipple portion extending through the flange for connection to an outlet end segment of the tube opposite the inlet end segment.

2. The vapor pressure detection system set forth in claim 1, wherein the vapor pressure sensor is attached to the flange.

3. The vapor pressure detection system set forth in claim 1, further comprising:
    a birdcage structure attached to the inlet end segment, wherein the vapor permeable membrane covers the birdcage structure.

4. The vapor pressure detection system set forth in claim 1, wherein the vapor permeable membrane is generally impermeable to liquid.

* * * * *